(12) United States Patent
Calleja et al.

(10) Patent No.: US 9,475,441 B2
(45) Date of Patent: Oct. 25, 2016

(54) UNIQUE AND EFFICIENT GRILLE DESIGN WITH INTEGRATED ENERGY ABSORBER AND ENERGY ABSORBER WITH LOCKING FEATURE

(71) Applicant: FORD GLOBAL TECHNOLOGIES, LLC, Dearborn, MI (US)

(72) Inventors: Juan Moises Calleja, Mexico City (MX); Rabin Bhojan, Northville, MI (US); Irfan Sharif, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 14/589,276

(22) Filed: Jan. 5, 2015

(65) Prior Publication Data

US 2016/0193977 A1  Jul. 7, 2016

(51) Int. Cl.
| | | |
|---|---|---|
| *B60R 19/12* | (2006.01) | |
| *B60K 11/08* | (2006.01) | |
| *B62D 25/08* | (2006.01) | |
| *B60R 19/52* | (2006.01) | |
| *B60R 19/48* | (2006.01) | |

(52) U.S. Cl.
CPC ............... *B60R 19/12* (2013.01); *B60K 11/08* (2013.01); *B62D 25/084* (2013.01); *B60R 2019/486* (2013.01); *B60R 2019/525* (2013.01)

(58) Field of Classification Search
CPC ............... B62D 25/084; B60R 19/12; B60R 2019/525; B60R 2019/486; B60K 11/08
See application file for complete search history.

(56) References Cited

U.S. PATENT DOCUMENTS

| | | |
|---|---|---|
| 5,482,336 A | 1/1996 | Rouse et al. |
| 6,921,117 B2 | 7/2005 | Rackham et al. |
| 6,997,490 B2 | 2/2006 | Evans et al. |
| 8,424,629 B2 | 4/2013 | Ralston et al. |
| 8,480,143 B2 * | 7/2013 | Huang .............. B60R 19/04 293/120 |
| 8,646,552 B2 | 2/2014 | Evans et al. |
| 2007/0222237 A1 | 9/2007 | Kemp et al. |
| 2009/0066096 A1 | 3/2009 | Doroghazi et al. |
| 2013/0223980 A1 | 8/2013 | Pastrick et al. |

FOREIGN PATENT DOCUMENTS

WO   2006008394 A1   1/2006

OTHER PUBLICATIONS

English machine translation of WO2006008394.

* cited by examiner

*Primary Examiner* — Glenn Dayoan
*Assistant Examiner* — Melissa A Black
(74) *Attorney, Agent, or Firm* — Jason Rogers; King & Schickli PLLC

(57) ABSTRACT

An energy absorber assembly for a motor vehicle includes a first deformable energy absorbing component and at least one deformable second energy absorbing component associated with a grille assembly of the motor vehicle. The first energy absorbing component defines at least one receiver for engaging a corresponding portion of the at least one second energy absorbing component whereby the receiver and the mating surface remain engaged on receiving an impact. The first energy absorbing component is carried on a bumper assembly or attached to a fascia assembly of the motor vehicle, and the second energy absorbing component is included in a grille carrier component of the motor vehicle grille assembly.

13 Claims, 7 Drawing Sheets

UNIQUE AND EFFICIENT GRILLE DESIGN WITH INTEGRATED ENERGY ABSORBER AND ENERGY ABSORBER WITH LOCKING FEATURE

TECHNICAL FIELD

This disclosure relates to motor vehicle energy absorbers. More particularly, the disclosure relates to an energy absorber for a motor vehicle including a locking feature for preventing separation during impact of a grille structure also including an integrated energy absorber, thereby increasing efficiency in absorbing impact energy.

BACKGROUND

Modern motor vehicles include a variety of safety features to protect occupants of the vehicle in the event of a collision, including safety belts, air bags, and bumpers. As is known, typically a motor vehicle bumper will include an energy absorber component. Such energy absorber components are intended for impact protection in the event of a vehicle or pedestrian impact, and are typically deformable elements designed to absorb a majority of impact energy early in the impact, while also ensuring pedestrian protection.

As shown in FIG. 1, in a motor vehicle 10, there is typically provided a bumper assembly 12 which carries an energy absorber 14. A grille assembly 16 and an air intake element 18 are depicted also. With reference to FIG. 2, conventionally the areas encompassed by the grille assembly 16 and the energy absorber 14 do not overlap (see brackets A and B).

However, many modern motor vehicles incorporate grille assemblies which cover a larger portion of the motor vehicle front area, to provide increased air flow to the motor vehicle engine for cooling purposes and also because of aesthetic reasons and consumer preferences. Enlarging the grille assembly 16 undesirably causes the area encompassed by the grille assembly 16 to overlap the area encompassed by the energy absorber 14 (see FIG. 3, brackets A and B). This places the grille assembly 16 in an area of the motor vehicle 10 front where damage to the grille and also intrusion of the grille into the motor vehicle 10 engine compartment is likely in a frontal impact. That is, on frontal impact, the grille assembly 16 is likely to separate from the energy absorber 14 since there is no connection therebetween. Safety regulations do not allow grille assemblies 16 to be positioned in areas likely to incur damage, unless the grille is proven to absorb impact energy as an integral part of the energy absorption system of the motor vehicle 10.

Simply fastening the energy absorber 14 to the grille assembly 16 might alleviate this problem, but would present additional difficulties and added complexity and cost to the motor vehicle assembly process. Therefore, to solve these and other problems the present disclosure describes an energy absorber assembly for a motor vehicle. Advantageously, the disclosed energy absorber assembly retains engagement between a bumper-mounted energy absorber and a grille assembly in the event of an impact, causing the grille assembly to integrate into the overall energy absorption system of the motor vehicle, but does not require that any portion of the grille assembly be actually fastened to the bumper-mounted energy absorber.

SUMMARY

In accordance with the purposes and benefits described herein, an energy absorber assembly for a motor vehicle is disclosed. The first energy absorbing component is carried on a bumper assembly of the motor vehicle, and the second energy absorbing component is included in a grille carrier component of the motor vehicle grille assembly. The assembly includes a first deformable energy absorbing component and at least one deformable second energy absorbing component associated with a grille assembly of the motor vehicle. In embodiments, the grille carrier component includes a plurality of second energy absorbing components configured for slotting into engagement with a plurality of corresponding first energy absorbing component receivers. By this feature, the receiver and the second energy absorbing component remain engaged as the first deformable energy absorbing component deforms on receiving a frontal impact.

In another aspect, a grille assembly for a motor vehicle is provided, including a grille element defining at least one air inlet and a grille carrier element for supporting the grille element. The grille carrier element includes at least one deformable energy absorbing component which slottingly engages a corresponding receiver defined in a motor vehicle bumper-mounted deformable energy absorber.

In yet another aspect, a bumper-mounted or vehicle fascia-mounted deformable energy absorber for a motor vehicle is provided, comprising a deformable energy absorbing component defining at least one receiver for engaging a portion of at least one corresponding grille-carrier mounted deformable energy absorbing component. The receiver is configured to remain engaged with the corresponding grille-carrier mounted deformable energy absorbing component portion on receiving an impact.

In the following description, there are shown and described embodiments of the disclosed motor vehicle energy absorber assembly. As it should be realized, the energy absorber assembly is capable of other, different embodiments and its several details are capable of modification in various, obvious aspects all without departing from the attachment joint as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed motor vehicle panel attachment joint, and together with the description serve to explain certain principles thereof. In the drawing.

Reference will now be made in detail to embodiments of the disclosed attachment joint, examples of which are illustrated in the accompanying drawing figures.

DETAILED DESCRIPTION

Figure 1:
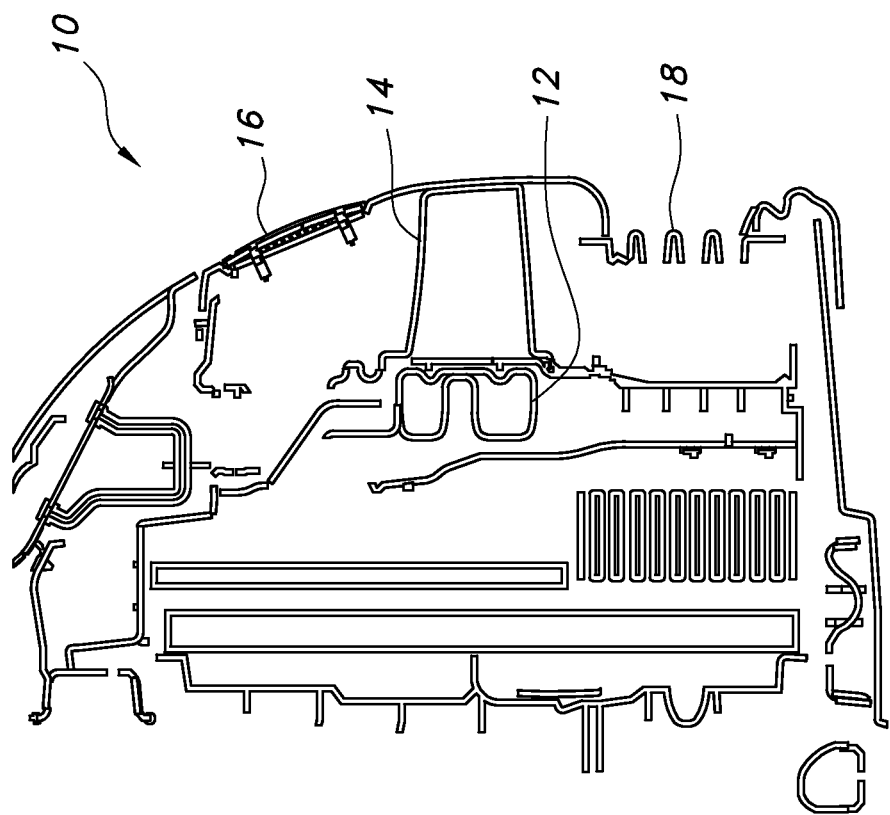
FIG. 1 shows a motor vehicle front including a conventional energy absorber.
Figure 2:
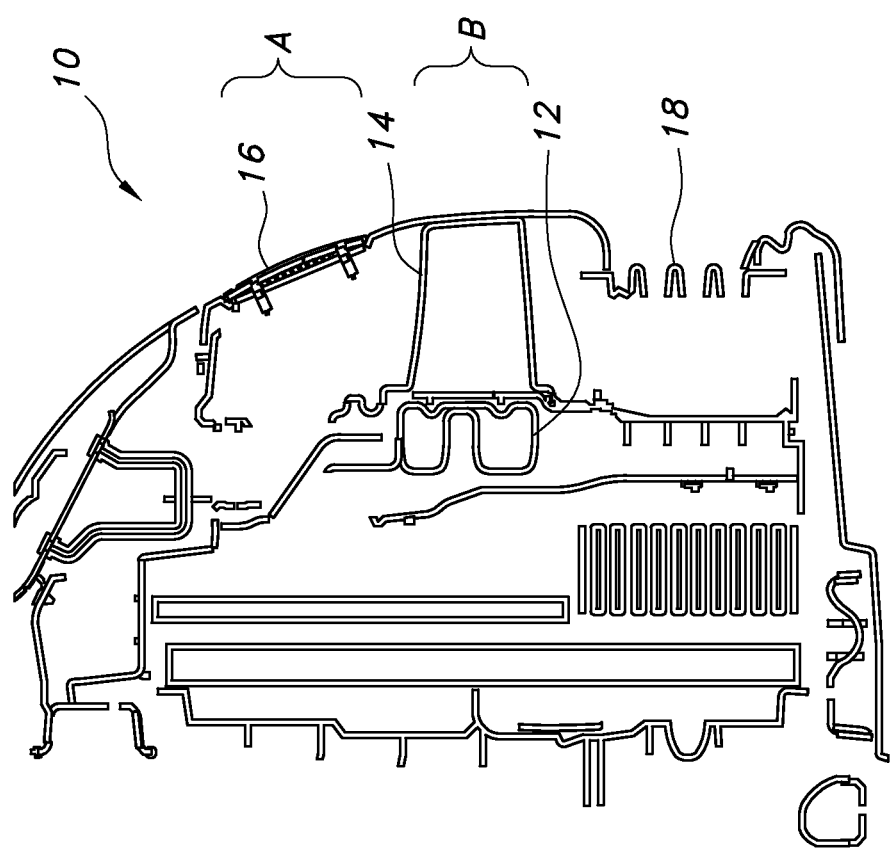
FIG. 2 shows the motor vehicle front of claim 1, wherein the grille and energy absorber do not overlap.
Figure 3:
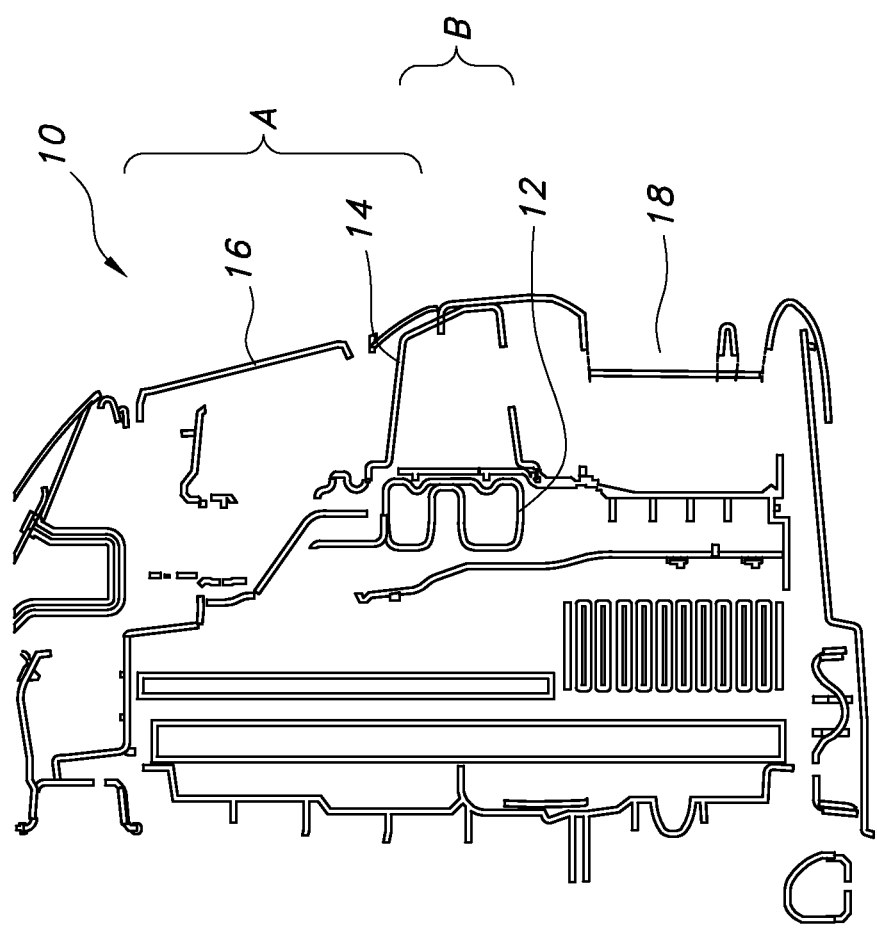
FIG. 3 depicts a motor vehicle front having a larger grille assembly, wherein the grill and energy absorber overlap.
Figure 4:
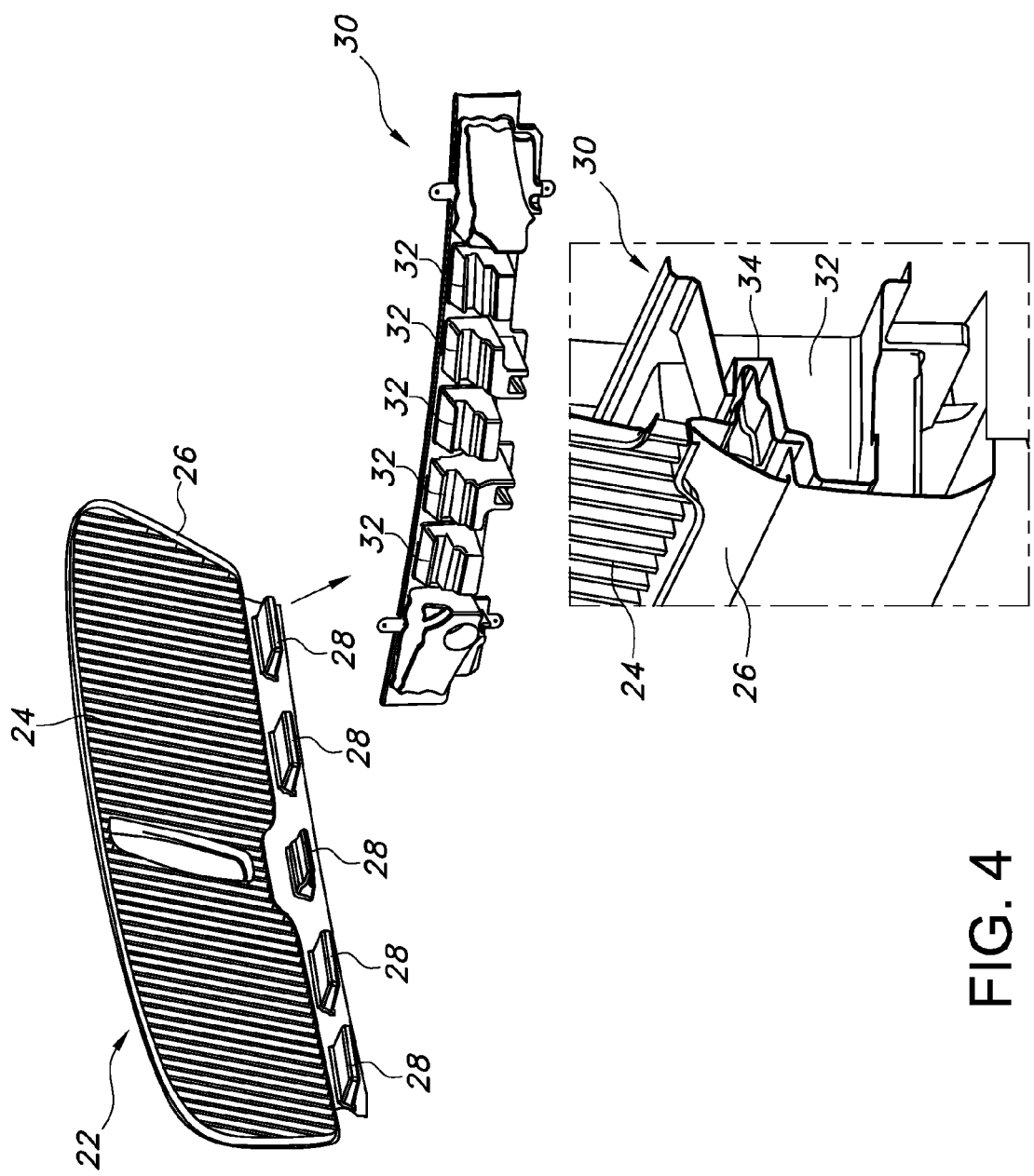
FIG. 4 shows an energy absorber assembly according to the present disclosure.

Reference is now made to FIG. 4 illustrating an energy absorber assembly 20 according to the present disclosure. A grille assembly 22 includes a grille component 24 and a grille support or carrier 26. Included in the grille support or carrier 26 are a plurality of grille carrier energy absorbers 28.

Figure 5:
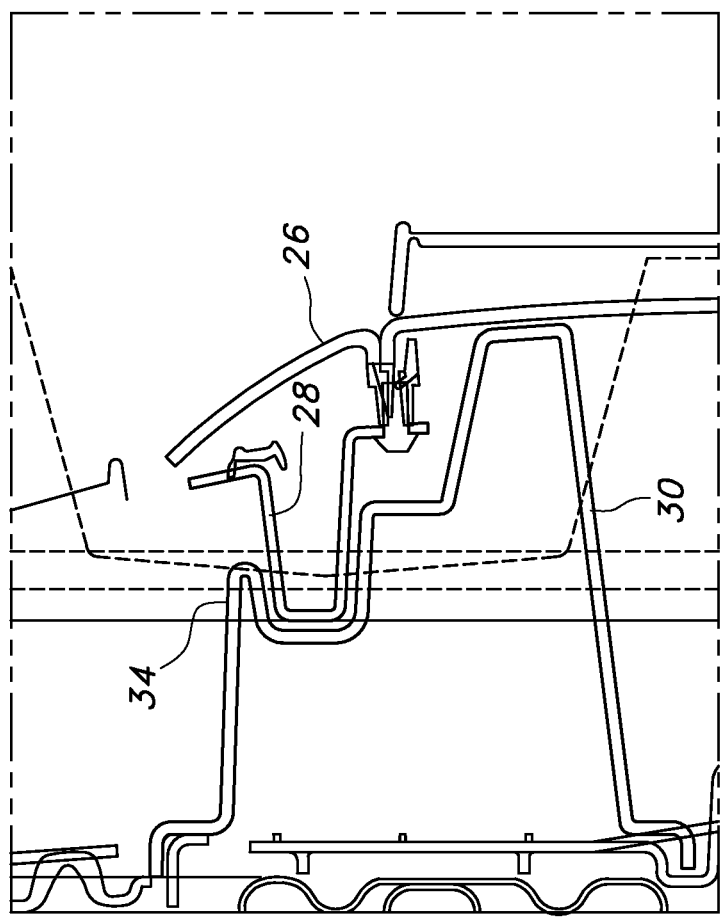
FIG. 5 shows a side view of the assembled energy absorber assembly of FIG. 4.
Figure 6:
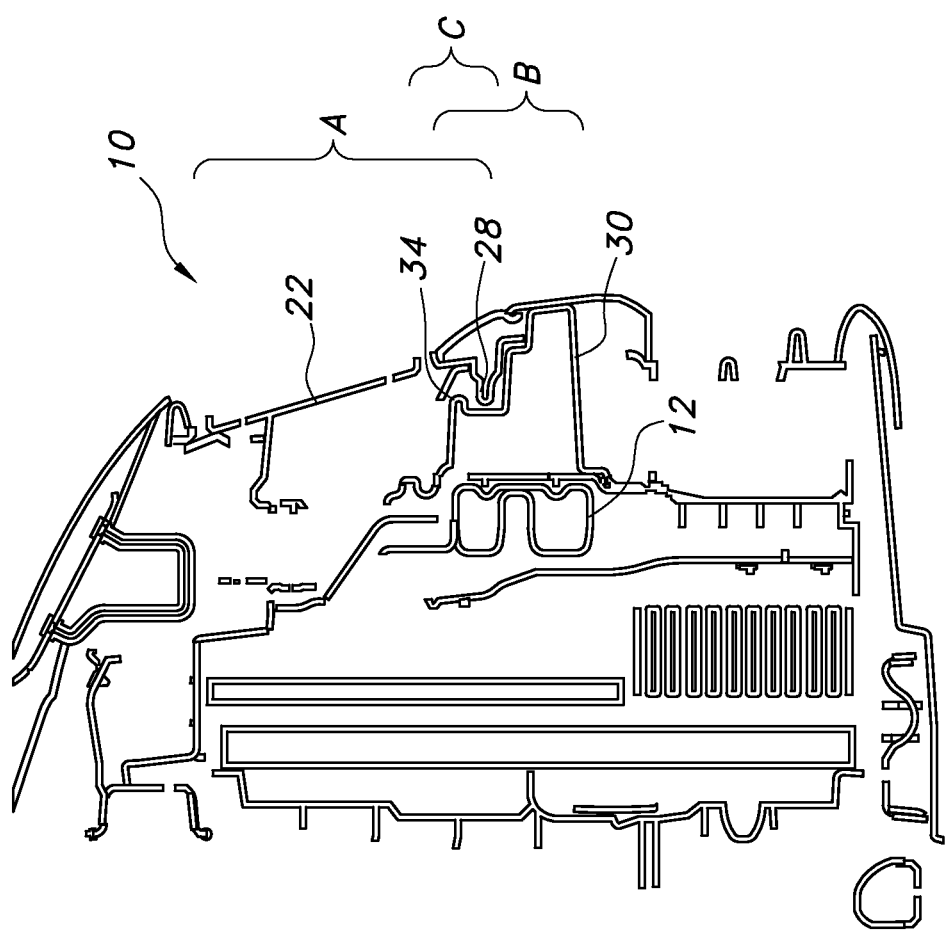
FIG. 6 depicts the shared energy absorption function of the assembly of FIG. 4.

A bumper-mounted or vehicle fascia-mounted energy absorber 30 is provided, including a plurality of spaced-apart deformable energy-absorbing structures 32 which, as is known in the art, individually deform upon impact and so absorb the energy of the impact. As noted, the energy absorber 30 may be mounted to a vehicle bumper or to a fascia attached to the vehicle. Each of the structures 32 define a receiver 34 which receives a portion of a grille carrier energy absorber 28. Thus, when the grille assembly 22 is assembled to the motor vehicle, a portion of each grille carrier energy absorber 28 is slottingly engaged by a receiver 34 of the bumper-mounted energy absorber 30 (see FIG. 5). As shown in FIG. 6, even in motor vehicles 10 where the areas of the grille assembly 22 and energy absorber 30 overlap (see brackets A, B), by the interaction of the receiver 34 and the grille carrier energy absorber 28 the grille assembly 22 and energy absorber 30 in fact create a packaged element that shares the function of dissipating energy of impact.

Figure 7A:
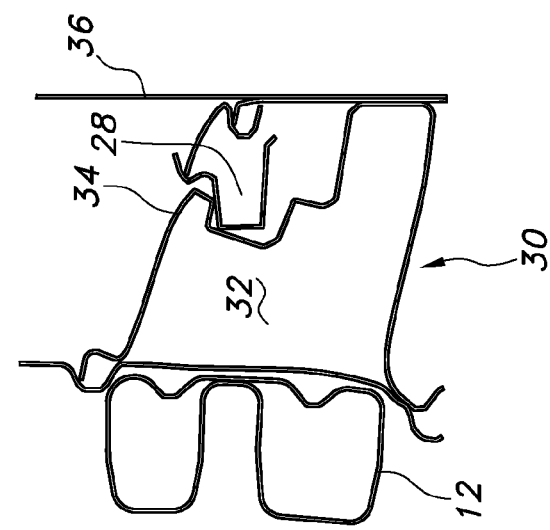
FIG. 7A depicts the interaction of the components of the energy absorption assembly of the present disclosure prior to a frontal impact.
Figure 7B:
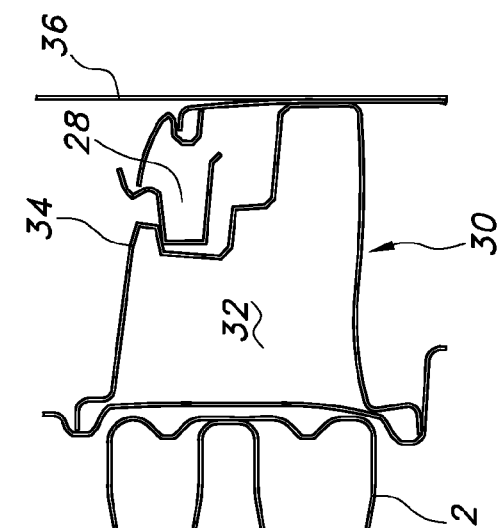
FIG. 7B depicts the interaction of the components of the energy absorption assembly of the present disclosure immediately upon frontal impact.
Figure 7C:
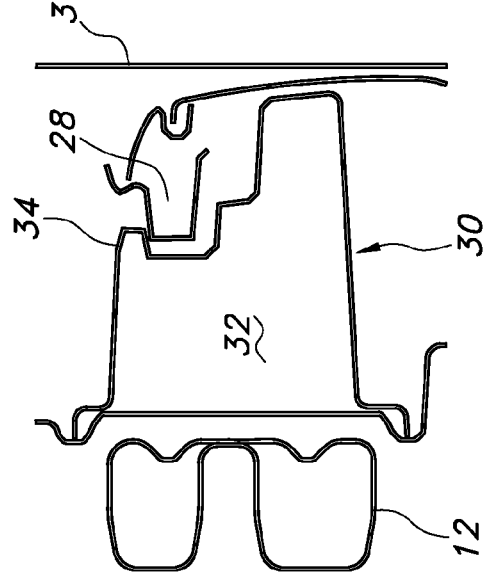
FIG. 7C depicts the interaction of the components of the energy absorption assembly of the present disclosure immediately after frontal impact.

Specifically, as shown in FIGS. 7A-C, on a frontal impact such as by a flat barrier 36, each energy-absorbing structure 32 begins to deform to absorb the energy of impact. As each energy-absorbing structure 32 deforms, the engagement of the grille assembly 22 and the energy absorber 30 is retained by the slotting engagement of receiver 34 and grille carrier energy absorber 28 (see circled areas in FIGS. 7B and 7C). Because of this retained engagement, the grille assembly 22 and energy absorber 30 function as a unit to dissipate the energy of impact. Lacking those structures, as energy absorbing structure 32 fully deformed (see FIG. 7C) on impact, the engagement of the grille assembly 22 and the energy absorber 30 would be released and the grille assembly 22 would separate from the energy absorber 30 and be unable to contribute to absorbing the energy of impact.

Accordingly the skilled artisan will appreciate that the presently disclosed energy absorber assembly provides a simple and efficient mechanism for allowing a grille assembly of a motor vehicle to become part of the energy dissipation system of the vehicle. By this disclosed energy absorber assembly, larger grille assemblies are possible without violating safety regulations relating to impact protection.

The foregoing disclosure has been presented for purposes of illustration and description. It is not intended to be exhaustive or to limit the embodiments to the precise form disclosed. Obvious modifications and variations are possible in light of the above teachings, and all such modifications and variations are within the scope of the appended claims when interpreted in accordance with the breadth to which they are fairly, legally and equitably entitled.

What is claimed:

1. An energy absorber assembly for a motor vehicle, comprising:
   a first deformable energy absorbing component; and
   at least one deformable second energy absorbing component associated with a motor vehicle grille assembly;
   wherein the first energy absorbing component defines at least one receiver for slottingly engaging a portion of the at least one second energy absorbing component whereby the receiver and the at least one second energy absorbing component portion remain engaged on receiving an impact.

2. The energy absorber assembly of claim 1, wherein the first energy absorbing component is carried on a bumper assembly of the motor vehicle.

3. The energy absorber assembly of claim 1, wherein the second energy absorbing component is included in a grille carrier component of the motor vehicle grille assembly.

4. The energy absorber assembly of claim 3, wherein the grille carrier component includes a plurality of second energy absorbing components each configured for slotting into engagement with a plurality of corresponding first energy absorbing component receivers.

5. The energy absorber assembly of claim 1, wherein the impact is a frontal impact to the motor vehicle.

6. A motor vehicle including the energy absorber assembly of claim 1.

7. A method for transferring at least a portion of an impact energy associated with a frontal impact to a motor vehicle grille assembly, comprising:
   providing a first deformable energy absorbing component; and
   providing at least one deformable second energy absorbing component associated with the grille assembly;
   wherein the first energy absorbing component slottingly engages a portion of the at least one second energy absorbing component whereby the first energy absorbing component and the at least one second energy absorbing component remain engaged on receiving an impact.

8. The method of claim 7, including providing the first energy absorbing component carried on a bumper assembly of the motor vehicle.

9. The method of claim 7, including providing the second energy absorbing component as an element of a grille carrier component of the motor vehicle grille assembly.

10. The method of claim 9, including providing the grille carrier component including a plurality of second energy absorbing components each configured for slotting into engagement with a plurality of corresponding first energy absorbing component receivers.

11. A grille assembly for a motor vehicle, comprising:
    a grille element defining at least one air inlet;
    a grille carrier element for supporting the grille element, the grille carrier element including at least one deformable energy absorbing component, wherein the grille carrier element including at least one deformable energy absorbing component is configured for slottingly engaging a corresponding receiver defined in a motor vehicle bumper-mounted deformable energy absorber.

12. The grille assembly of claim 11, wherein the grille carrier element includes a plurality of deformable energy absorbing components each configured for slottingly engaging a plurality of corresponding receivers defined in the bumper-mounted deformable energy absorber.

13. A motor vehicle including the grille assembly of claim 11.

* * * * *